UNITED STATES PATENT OFFICE.

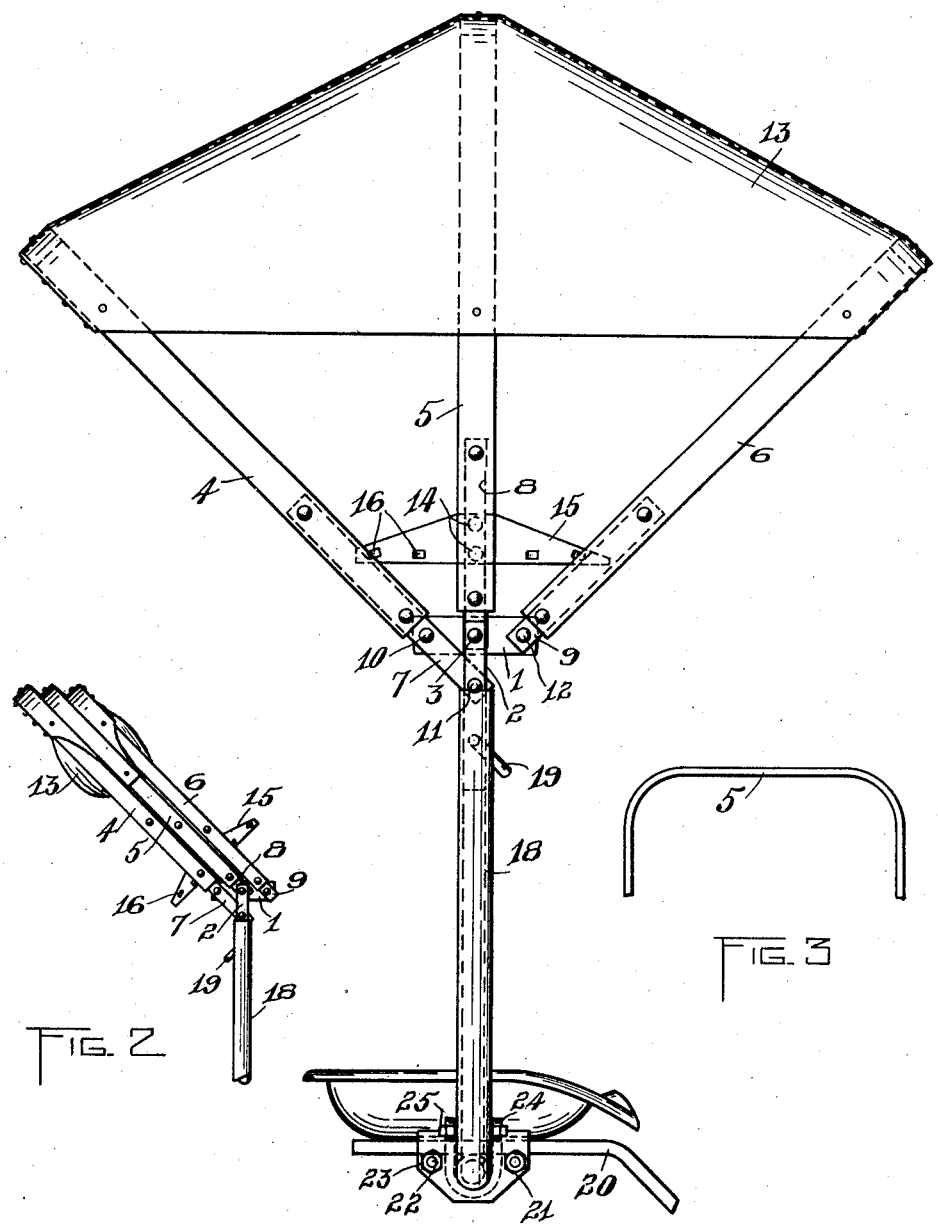

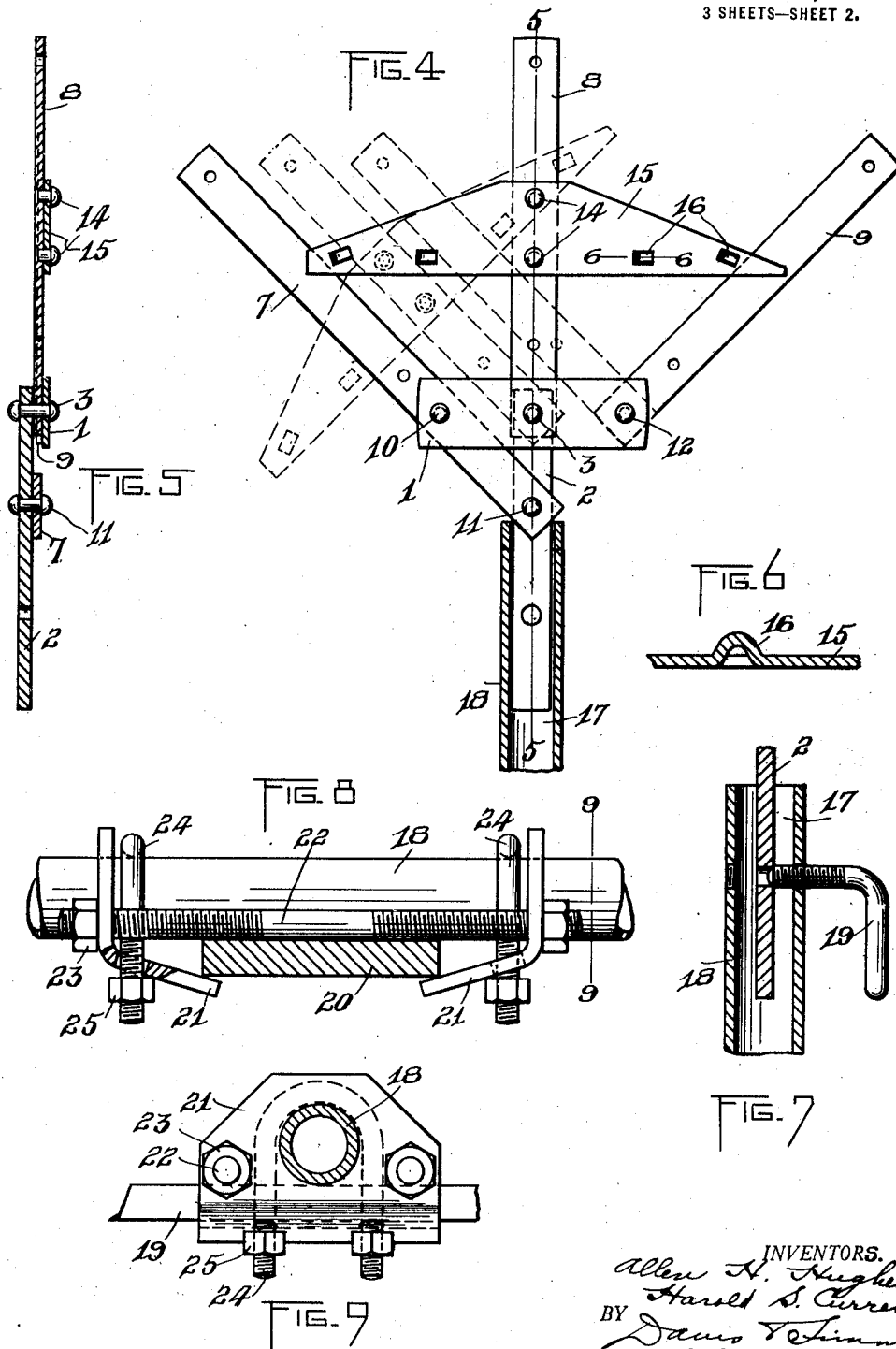

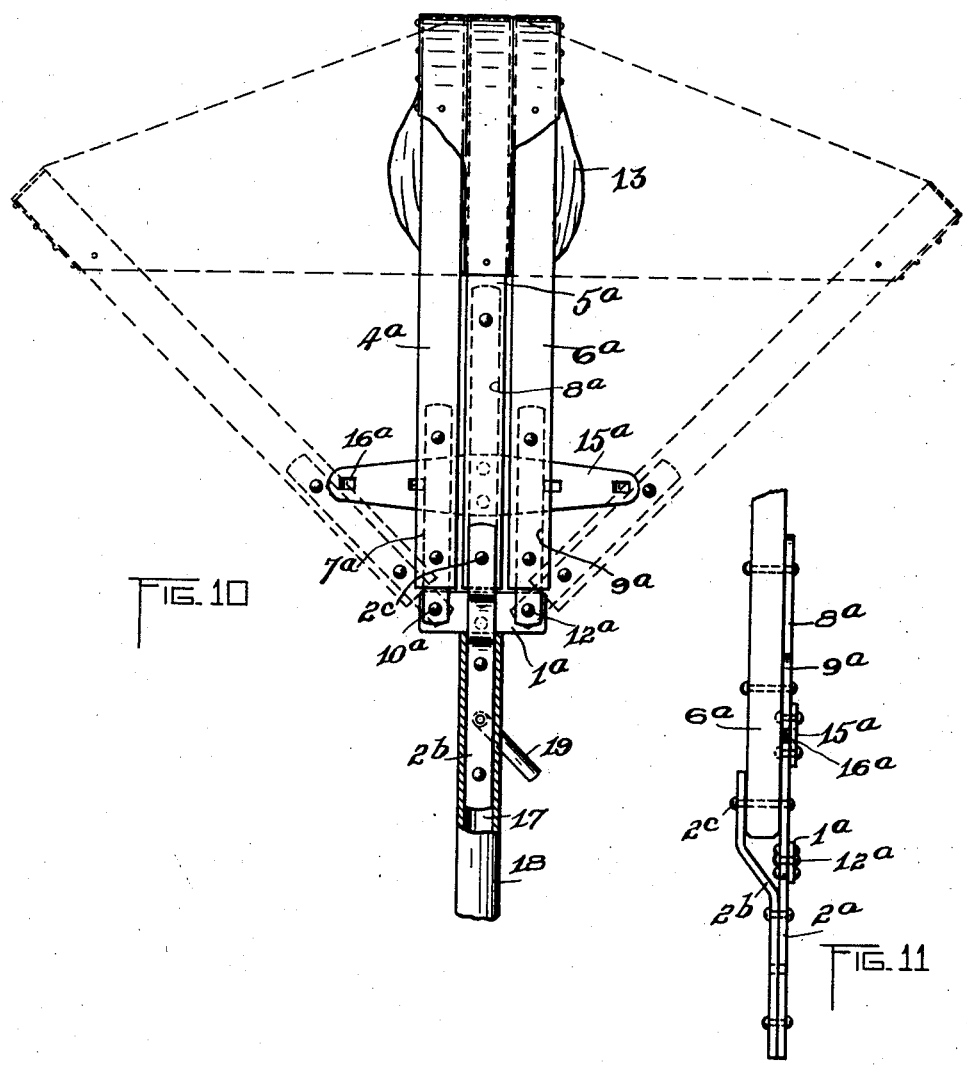

ALLEN H. HUGHES AND HAROLD S. CURREN, OF ROCHESTER, NEW YORK, ASSIGNORS TO HUGHES & CURREN COMPANY, INC., OF ROCHESTER, NEW YORK, A CORPORATION.

VEHICLE-TOP.

1,360,407.     Specification of Letters Patent.     Patented Nov. 30, 1920.

Application filed June 20, 1919. Serial No. 305,611.

*To all whom it may concern:*

Be it known that we, ALLEN H. HUGHES and HAROLD S. CURREN, citizens of the United States, and residents of Rochester, in the county of Monroe and State of New York, have invented certain new and useful Improvements in Vehicle-Tops, of which the following is a specification.

The present invention relates to vehicle tops and an object of the invention is to provide a simple and inexpensive means for effectively securing the bows of the top in folded or expanded conditions. Another object of the invention is to provide a vehicle top in which one of the bows acts as a brace between the pivot pieces and the anchoring posts. Still another object of the invention is to provide a construction in which one of the outer bows is immovable and arranged at an angle to the vertical, while the other bows are pivotally mounted so as to swing toward the immovable or stationary bow for the purpose of holding the top at the rear when the latter is in a folded condition. A still further object of the invention is to provide a securing means for a vehicle top which will permit the top to be effectively mounted upon the seat of a tractor or an agricultural implement.

To these and other ends the invention consists of certain parts and combinations of parts, all of which will be hereinafter described, the novel features being pointed out in the appended claims.

In the drawings:

Figure 1 is a side view of a vehicle top embodying the present invention and attached to a seat of the type used in tractors and agricultural implements;

Fig. 2 is a side view showing the top in folded condition;

Fig. 3 is a fragmentary view of one of the bows of the top;

Fig. 4 is an enlarged view with parts in section showing the connections between the plates at the ends of the bows and the anchoring post, the dotted lines showing the bow plates swung to folded position;

Fig. 5 is a section on the line 5—5, Fig. 4;

Fig. 6 is an enlarged section on the line 6—6, Fig. 4, showing a portion of the latches which hold the bows in folded and expanded condition;

Fig. 7 is a detail sectional view showing the manner in which the anchoring posts are secured to the securing means;

Fig. 8 is an enlarged sectional view showing the manner in which the U shaped securing member is attached to the seat supporting arm of the vehicle;

Fig. 9 is a section on the line 9—9, Fig. 8;

Fig. 10 shows in folded condition another embodiment of the invention, the dotted lines illustrating the top in expanded position; and Fig. 11 shows in side elevation the embodiment illustrated in Fig. 10.

Referring more particularly to the drawings, 1 indicates the pivot plates which preferably have depending therefrom, the anchoring posts 2, the anchoring posts in this instance being secured to the pivot plates by rivets 3. Mounted on the pivot plates are the bows 4, 5 and 6 preferably three in number, covered with a covering 13 and made of wood throughout the greater portion of their lengths with bow plates 7, 8 and 9 respectively at their free ends. One of these bow plates is preferably rigidly secured to the pivot plate while the others are pivotally connected to the pivot plates. In the embodiment shown in Figs. 1 to 9 inclusive, the bow plate 7 is rigidly secured at 10 to the pivot plate 1 near one end of said pivot plate and depends below the pivot plate, being secured at 11 to the adjacent post 2, thus acting to brace the connection between the post 2 and the pivot plate 1. At the same time this bow plate 7 is inclined to the vertical so that the rigid bow of the top is inclined to the vertical, being preferably arranged at the rear of the top. The bow plates 8 and 9 are pivoted respectively at 3 and 12 to the pivot plates 1. By this arrangement the pivot plates may be swung to the full line positions shown in Fig. 1 in which they lie at different angles to the bow plates 7 of the bow 4, or the bow plates 8 and 9 may be swung in parallelism with the bow plate 7 in which condition the top will be folded as shown in Fig. 2.

For the purpose of holding the top in expanded and also in folded positions, a plate is secured at 14 to the bow plate 8 above the pivot of said plate 8 and this locking plate 15 provides two spring arms extending from opposite sides of the bow plate 8. Each of these arms is preferably provided with two projections or tongues 16 struck up from the metal of the plate 15 in such positions that when the top is expanded, those tongues 16 which are nearer the free ends of said spring arms will engage with the bow plates 7 and 9 and hold the top expanded, while, when the top is in folded position, those tongues 16 which are nearer the bow 8 will engage with the plates 7 and 9 and hold the top in folded condition.

The posts 2 may be secured in any suitable manner. In this instance they are secured in sockets 17 formed by the ends of a U shaped tubular member 18, the lower ends of the bow plate 7 resting against the upper ends of the tubular member, while the hand screw 19 carried by the tubular member acts to secure the posts in the socket in the manner illustrated in Fig. 7. The U shaped member 18 is secured to the seat bar 20 of a tractor or agricultural implement by clamping means comprising preferably two annular clamping plates 21 perforated to fit about the bar 18 and having their other portions extending toward each other and engaging over the seat bar 20 as the member 18 rests under said bar. The plates 21 are preferably adjustably connected by two screws 22, locking nuts 23 being provided on the end of said screws. U shaped clips 24 also surround the tubular member 18 and at the same time pass through openings in the clamping plates 21. The ends of these clips 24 carry nuts 25 adapted to bear against the clamping plates 21 for the purpose of drawing said plates simultaneously into engagement with the seat bar 20 thus effectively clamping the top as a whole to the seat bar.

In the embodiment of the invention shown in Figs. 10 and 11, the bow $5^a$ is rigidly secured to the pivot plates $1^a$ while the bows $4^a$ and $6^a$ are pivotally mounted at $10^a$ and $12^a$ respectively on the pivot plates $1^a$. In this embodiment, the posts are formed by extending the plates $8^a$ of the bow $5^a$ below the pivot plates $1^a$ as at $2^a$, and braces are obtained by riveting plates $2^b$ to the extension $2^a$ and extending such plates upwardly and securing them at $2^c$ to the bow $5^a$. The plates $15^a$ are secured to the bow plates $8^a$ of the central bow and extend in opposite directions with the projections $16^a$ for engagement with the bow plates $7^a$ and $9^a$ to hold the vehicle top in folded or expanded condition, all of which will be clear by reference to Figs. 10 and 11.

In both embodiments of the invention, the vehicle top has a plurality of bows preferably three in number, in which one of the bows is rigidly connected to pivot plates. while the other bows are pivotally mounted on said pivot plates and swung into parallelism with the rigid bow for the purpose of folding the top. The central bow carried oppositely extending spring arms adapted to engage with the two outside bows for the purpose of holding the top in folded or expanded condition. In one embodiment of the invention the rigid bow for one of the outside bows lies at an angle to the anchoring or attaching post.

In both embodiments, the fastening means for holding the top in folded and expanded condition is automatic and therefore all straps, set screws or nuts and folding braces are dispensed with.

What we claim as our invention and desire to secure by Letters Patent is:

1. A vehicle top comprising a pair of pivot pieces, three bows, one of which is rigidly connected to the pivot pieces and the others of which are pivotally connected to the pivot pieces, and spring arms secured to and extending in opposite directions from the central bow to coöperate with the other two bows for the purpose of locking the top in its folded or in its expanded condition.

2. A vehicle top comprising two pivot pieces, anchoring posts formed by pieces separate from the pivot pieces and depending from the pivot pieces, and a plurality of bows, one of which is rigidly connected to the pivot pieces and extends beyond the pivot pieces and is also connected to the anchoring posts to brace the latter with reference to the pivot pieces and the other of said bows being pivotally connected to the pivot pieces.

3. A vehicle top comprising two pivot pieces, anchoring posts formed by pieces separate from the pivot pieces and depending centrally from said pivot pieces, a bow rigidly connected to the two pivot pieces at one side of the longitudinal axes of the posts, lying at an angle to said anchoring posts, and being extended beyond the pivot pieces and connected to such posts below the pivot pieces, and other bows pivoted to the pivot pieces one of which is in line with the anchoring posts and the other of which is on the opposite side of the anchoring posts.

4. A vehicle top comprising a pair of pivot pieces, three bows, one of which is rigidly connected to the pivot pieces, and the other two of which are pivotally connected to the pivot pieces, and plates secured to the central bow and extending from opposite sides thereof to provide oppositely extending spring arms, said arms being provided with projections adapted to coöperate with the other two bows for the purpose of holding the top in a folded or in an expanded condition.

5. In combination with a seat supporting bar, a vehicle top having depending attaching posts, a U-shaped member extending under the seat supporting bar and having socketed ends projecting upwardly and receiving said posts, and adjustable clamping means for securing said U-shaped member to the bar.

6. In combination with a seat supporting bar, a vehicle top having depending attaching posts, supporting means for said top comprising a U-shaped member to which said posts are secured extending under the bar, and angled clamping plates adjustable toward and from each other on said U-shaped member to engage opposite edges of the bar.

7. In combination with a seat supporting bar, a vehicle top, supporting means for said top comprising a U shaped member, extending under the bar and projecting upwardly on opposite sides of the bar two clamps movable on said U shaped member to engage opposite edges of the bar and a screw connecting said clamps.

8. In combination with a seat supporting bar, a vehicle top, supporting means for said top comprising a U shaped member extending under the bar and projecting upwardly on opposite sides thereof, angled clamps movable on said U shaped member, and U shaped clips passed about the U shaped member and through said angled clamps.

9. In combination with a vehicle top, supporting means for said top comprising a U shaped member, two angled clamps adjustable on said U shaped member, screws connecting said clamps, and two U shaped clips each passing about the U shaped member and through the angled clamps.

ALLEN H. HUGHES.
HAROLD S. CURREN.